A. OHNEMUS.
WATER PAN ATTACHMENT FOR HOT AIR FURNACES.
APPLICATION FILED OCT. 29, 1914.

1,127,085.

Patented Feb. 2, 1915.

WITNESSES

INVENTOR
ANTON OHNEMUS
BY Munn & Co.
ATTORNEYS

UNITED STATES PATENT OFFICE.

ANTON OHNEMUS, OF QUINCY, ILLINOIS, ASSIGNOR TO EXCELSIOR STOVE AND MFG. CO., OF QUINCY, ILLINOIS.

WATER-PAN ATTACHMENT FOR HOT-AIR FURNACES.

1,127,085.  Specification of Letters Patent.  Patented Feb. 2, 1915.

Application filed October 29, 1914. Serial No. 869,238.

*To all whom it may concern:*

Be it known that I, ANTON OHNEMUS, a citizen of the United States, and a resident of Quincy, in the county of Adams and State of Illinois, have invented a new and useful Improvement in Water-Pan Attachments for Hot-Air Furnaces, of which the following is a specification.

My invention relates to water pans or evaporating pans for hot-air furnaces, and it consists in the constructions, combinations and arrangements herein described and claimed.

An object of my invention is to provide an evaporating pan which may be readily removed from the furnace so as to free the same from sediment or dirt which may collect therein.

A further object of my invention is to provide a removable evaporating pan of the type described which is in convenient position to be readily brought into view so as to fill the latter or to inspect the contents thereof.

Other objects and advantages will appear in the following specification, and the novel features of the device will be particularly pointed out in the appended claims.

My invention is illustrated in the accompanying drawings forming part of this application, in which—

Figure 1:
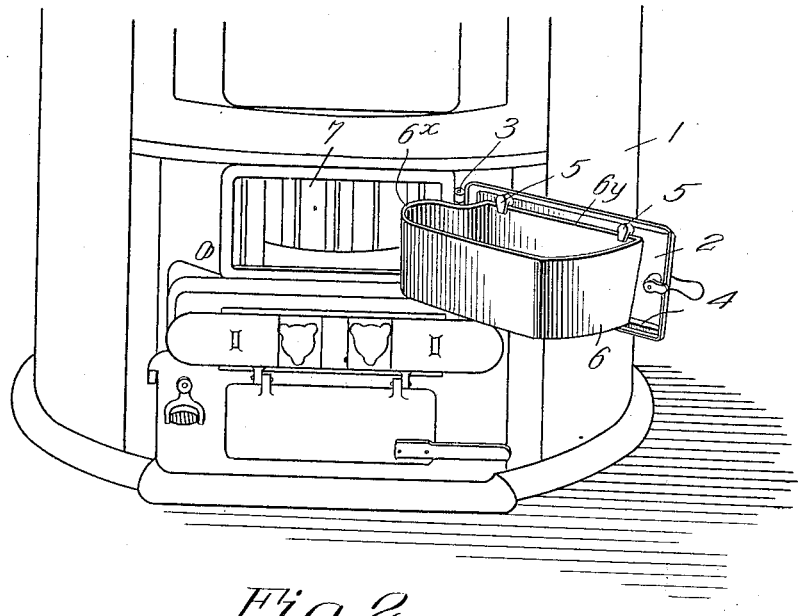
Figure 2:
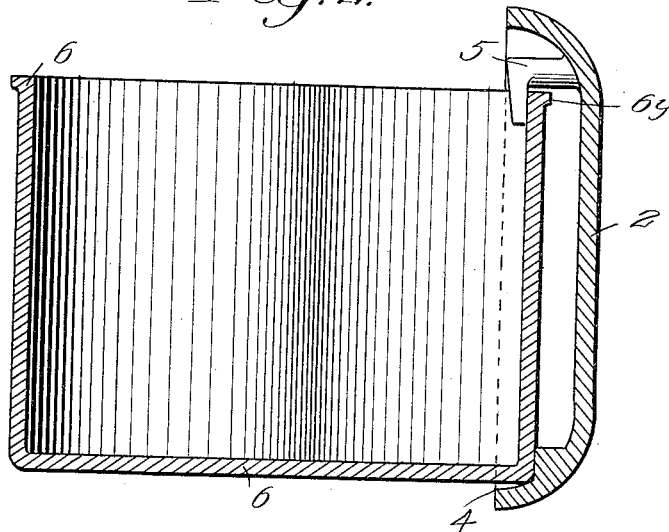

Figure 1 is a perspective view of my invention as applied to a furnace. Fig. 2 is a vertical section through the pan and the furnace door.

In carrying out my invention I may make use of any ordinary furnace having a casing 1, and being provided at its front, rear, or in any other suitable place, with a door 2, which is hinged to the casing 1 at 3. The door 2 is provided at its lower edge with a flange 4, and with integral L-shaped lugs 5, near the top thereof.

The evaporating pan 6 is of the shape shown in the drawings and is provided with an extension $6^x$. The depth of the pan is substantially the distance between the flange 4 and the lugs 5.

From the foregoing description of the various parts of the device, the operation thereof may be readily understood.

In placing the pan in position, it is only necessary to open the door, then tilt the pan until the edge $6^y$ clears the lower end of the L-shaped lugs 5, when the bottom portion of the pan is brought to rest on the flange 4. The weight of the pan will hold it securely in position. When the door is shut, the extended portion $6^x$ will enter the door opening 7, so that a pan of a greater length than the door itself, may be attached to the door and be swung easily into and out of the air space between the outer casing of the furnace and the fire-pot.

It will be observed that in my invention, in removing the pan from the door, it is only necessary to tilt the pan upwardly until the lower end clears the flange 4, and the pan will immediately slip out.

It will be observed that the evaporating pan in the present instance is raised from the floor and is thus near the hotter part of the furnace. It is furthermore in such position that one does not have to stoop over as he does when the pan is down at the base of the furnace. The interior of the evaporating pan may thus be readily inspected.

The extension $6^x$ provides, as stated before, a pan having a large capacity and the pan may be actually longer than the door or than the door opening, since when the door is swung into closed position the extension $6^x$ will extend in behind the casing to which the door is hinged.

I claim:

1. The combination with a furnace having a door opening, of a door for said furnace hinged to the outer casing thereof, and an evaporating pan detachably secured to the door on the inner side thereof, said pan having an extension at one end projecting beyond the hinged end of the door and spaced therefrom so as to enter the door opening, when the door is closed.

2. The combination with a furnace having a door opening, of a door for closing said opening, said door being provided with a flange at its lower edge and having L-shaped lugs near its top, and an evaporating pan having an upper edge arranged to enter behind the L-shaped lugs, a portion of the bottom of the pan being adapted to rest on or against said flange.

ANTON OHNEMUS.

Witnesses:
JAMES R. CLEM,
GEORGE A. RECKMEYER.

Copies of this patent may be obtained for five cents each, by addressing the "Commissioner of Patents, Washington, D. C."